United States Patent [19]

Levin

[11] 4,200,524
[45] Apr. 29, 1980

[54] BIO-SURFACE SEPARATION PROCESS

[75] Inventor: Gilbert V. Levin, Chevy Chase, Md.

[73] Assignee: Biospherics Incorporated, Rockville, Md.

[21] Appl. No.: 954,534

[22] Filed: Oct. 25, 1978

[51] Int. Cl.$^2$ ............................................... C02C 1/04
[52] U.S. Cl. ............................................ 210/5; 210/6; 210/17
[58] Field of Search ................... 210/6, 17, 18, 5, 10, 210/67

[56] References Cited

U.S. PATENT DOCUMENTS

| | | | |
|---|---|---|---|
| 3,803,029 | 4/1974 | Blecharczyk | 210/16 |
| 3,904,518 | 9/1975 | Hutton et al. | 210/11 |
| 3,977,966 | 8/1976 | Pradt et al. | 210/17 |
| 4,055,490 | 10/1977 | Hasegawa et al. | 210/17 |
| 4,076,615 | 2/1978 | Olesen et al. | 210/6 X |

Primary Examiner—Thomas G. Wyse
Attorney, Agent, or Firm—Roylance, Abrams, Berdo & Farley

[57] ABSTRACT

There is disclosed an activated sludge sewage treatment process which comprises mixing influent sewage material with activated sludge and bio-surface particulates to provide a mixed liquor. The mixed liquor is passed to an aeration zone wherein it is contacted with an oxygen-containing gas to reduce the BOD content thereof. The mixed liquor is then passed to a settling zone in which it is settled to separate bio-surface particulates having sludge particles adherent thereto and a clarified supernatant. The clarified supernatant is removed from the settling zone and is discharged as effluent or routed for further treatment. At least a portion of the bio-surface particulates having sludge adherent thereto is subjected to a treatment to separate at least a portion of the adherent sludge particles. The thus treated portion of the bio-surface particulates, which may still have some sludge particles adherent thereto, and separated sludge particles is then passed to a bio-surface particulate sludge separator. In this separator, the sludge present in the mixture which is not adherent to the bio-surface particulates separates from the bio-surface particulates and at least a portion of the sludge is passed out of the system as waste sludge which is essentially free of the biosurface particulates. The bio-surface particulates and remaining sludge are then recycled for mixing with said influent sewage material.

3 Claims, 1 Drawing Figure

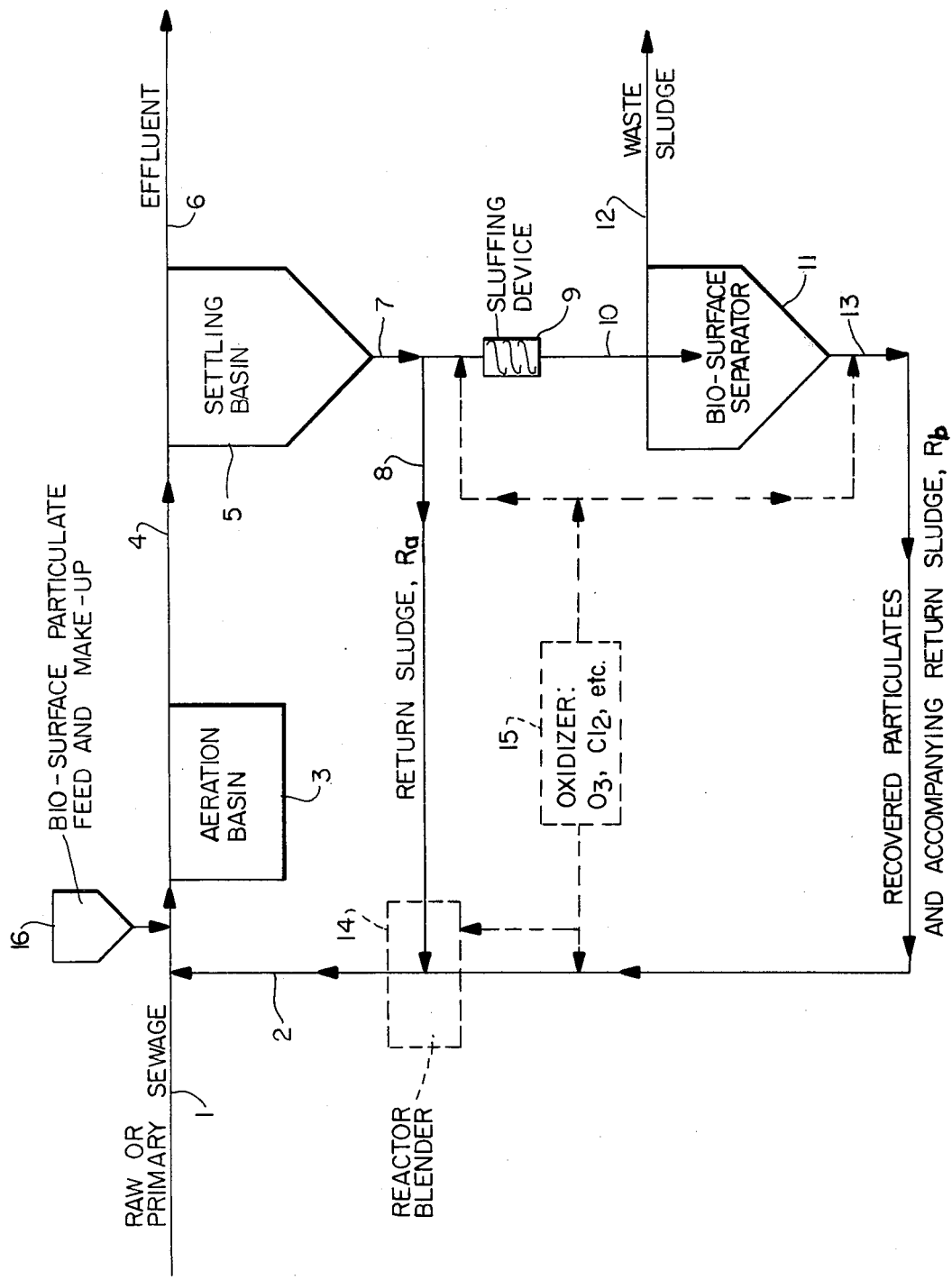

BIO-SURFACE SEPARATION PROCESS

A number of waste water treatment processes depend upon the introduction of particulates into the aeration or oxygenation treatment of sewage. Sludge organisms adhere to and grow on the particulates with a resultant improvement of treatment over processes not using such particulates. Such processes are shown, for example, in U.S. Pat. Nos. 3,779,906 to Levin; 3,803,029 to Blecharczyk; 3,904,518 to Hutton et al; and 4,055,490 to Hasegawa et al; and by Webber in Industrial Water Engineering, December, 1977, pages 20–27. Depending upon the specific process, the particulates may be inorganic or organic and may encompass synthetic plastics, activated carbon, fuller's earth, clays, coal or many other types of materials.

It is well known that in an activated sludge sewage treatment process, a portion of the sludge must be passed out of the system and another portion returned for mixing with influent sewage to provide a mixed liquor which is passed to the aeration basin.

An essential requirement for a process utilizing the introduction of particulates into the aeration or oxygenation treatment of sewage is that the particulates be recovered in order to prevent their discharge to the environment as a pollutant and to make the process an economical one through the reuse of the particulates. Thus, sludge containing particulates cannot simply be wasted because of the presence of particulates; and all of the sludge containing particulates cannot be recycled to the aeration basin since this does not provide for waste sludge which is necessary to keep the system in balance.

It is an object of this invention to provide an activated sludge sewage treatment process which utilizes particulates which act as bio-surfaces to support the growth of microorganisms in which substantially all the particulates are recycled for continuous use in the system and in which a sufficient quantity of sludge which is free from particulates is removed from the system to keep the system in balance.

It is another object of this invention to provide such a system in which sufficient activated sludge is separated from the particulate material to provide a particulate-free waste sludge in an amount sufficient to maintain the process balance.

These and other objects are attained by the practice of this invention which, briefly, comprises mixing influent sewage material with activated sludge and bio-surface particulates to provide a mixed liquor. The mixed liquor is passed to an aeration zone wherein it is contacted with an oxygen-containing gas to reduce the BOD content thereof. The mixed liquor is then passed to a settling zone in which it is settled to separate bio-surface particulates having sludge particles adherent thereto and a clarified supernatant. The clarified supernatant is removed from the settling zone and is discharged as effluent or routed for further treatment. At least a portion of the bio-surface particulates having sludge adherent thereto is subjected to a treatment to separate at least a portion of the adherent sludge particles. The thus treated portion of bio-surface particulates, which may still have some sludge particles adherent thereto, and separated sludge particles is then passed to a bio-surface particulate sludge separator. In this separator, a portion of the sludge present in the mixture which is not adherent to the bio-surface particulates separates from the bio-surface particulates and at least a portion of the sludge is passed out of the system as waste sludge which is essentially free of the bio-surface particulates. The bio-surface particulates and remaining sludge are then recycled for mixing with said influent sewage material.

The invention is illustrated in the accompanying drawing wherein the FIGURE is a flow diagram of the bio-surface separation process of this invention.

A raw sewage influent stream 1 is passed through conventional screen and grit removing units and is optionally subjected to primary settling during which a primary sludge is removed. The raw or primary sewage is mixed with recycled, activated sludge and bio-surface particulates from line 2 to form a mixed liquor. The mixed liquor is passed to an aeration basin 3. In the aeration basin 3, air, oxygen-enriched air, or oxygen is mixed with the mixed liquor at a rate sufficient to maintain it aerobic—i.e., so that there is a measurable amount of dissolved oxygen present in the mixed liquor—in at least a part of the aeration tank for a sufficient period of time, determined by the flow through rate or through batch process timing, to accomplish the desired degree of biological treatment, e.g., from 1 to 8 hours. During aeration, the bacteria present consume organic matter present in the sewage resulting in a high degree of BOD removal. The sludge organisms in large part adhere to and grow on the bio-surface particulates.

After aeration, the mixed liquor is passed by line 4 to a settling basin 5. In the settling basin 5, sludge and bio-surface particulates to which is adherent at least a portion of the sludge removed from the aeration basin separate and settle from the mixed liquor. A clarified effluent is discharged by line 6 from the settling basin 5. The clarified effluent may optionally be routed for further treatment.

Sludge and bio-surface particulates are removed as an underflow from the settling basin by line 7. Preferably, a portion of the underflow from the settling basin, designated $R_a$ in the drawing, is directly recycled by line 8 for mixing with raw or primary sewage in line 1.

The remaining portion of the underflow from the settling basin 5 removed by line 7 is passed through a sluffing device 9 which may be a separate unit, as shown, or incorporated into the pipe or the bio-surface separator. The sluffing device 9 frees at least a portion, but not necessarily all, of the sludge which had developed on the bio-surface particulates. The sluffing device may be mechanical with motion supplied, for example, by a centrifugal or reciprocating mechanism, such as a pump. Alternatively, the motion supplied in the sluffing device 9 may be sonic or ultrasonic vibration for removal of at least a portion of the sludge coating the particulates or the same result may be accomplished through hydraulic or pneumatic means, e.g., air, oxygen or other gas or gases. The sluffing device may be aided by the introduction of an oxidizing medium such as ozone or chlorine from the oxidizer 15. The use of an oxidant will tend to increase the ease with which the sluffing takes place. It is to be understood that the use of an oxidant is optional.

After passing through the sluffing device 9, the treated mixture composed of sluffed organic material which largely comprises microorganisms, and bio-surface particulates with or without some sludge particles still clinging to them, is passed by line 10 to a bio-surface separator 11. An oxidizing medium may be added to the separator 11 from the oxidizer 15. If the sludge particles have a specific gravity less than the specific gravity of the bare bio-surface particulates and of such particulates still having sludge organisms adhering thereto, the sludge organisms will rise to the top of the separator 11. Waste sludge which is essentially free of bio-surface particulates is then removed from the system by line 12.

If the microorganisms in the sludge have a specific gravity greater than the specific gravity of the bio-surface particulates and of such particulates still having sludge organisms adhering thereto, the particulates, with or without adherent sludge organisms, will migrate to the upper portion of the bio-surface separator. The waste sludge is then removed from the lower portion of the bio-surface separator where waste sludge free of the particulates will accumulate. Instead of a gravity bio-surface separator, a centrifugal separation device may be used as the bio-surface separator.

Magnetism may also be used to effect separation of adherent sludge from the bio-surface particulates. The bio-surface particulates may be provided with a magnetic component such that the discharge from the sluffing device through line 10 would be introduced into a magnetic filter or other magnetic separation device in conjunction with, in series with, or instead of, a bio-surface separator as previously described. The use of magnetic properties would make for more rapid separation and hence would permit the size of the bio-surface separator to be reduced.

Sludge free of bio-surface particulates is removed from the system and passed to waste in an amount sufficient to keep the overall sewage treatment process in balance. Thus, a key objective of the invention of maintaining all, or essentially all, of the bio-surface particulates within the treatment process is accomplished.

The underflow from the bio-surface separator removed by line 13, designated $R_b$ in the drawing, which comprises recovered particulates and, generally, some activated sludge, is passed for mixing with the particulates and adherent sludge in line 8 to form the mixture of activated sludge and bio-surface particulates in line 2 which is then mixed with influent raw or primary sewage before being passed to the aeration zone. It will be appreciated that the total amount of bio-surface particulates and activated sludge in line 2 comprises the sum of $R_a$ and $R_b$.

The portions of bio-surface particulates and activated sludge in lines 8 and 13 may be mixed in a reactor blender 14 to effect a more uniform dispersion of the particulates and the sludge organisms prior to mixing with the incoming sewage. Alternatively, or additionally, the reactor blender 14 may be used to regenerate the bio-surface particulates. Such regeneration may be accomplished simply by providing sufficient detention time for aerobic or anaerobic metabolism by which the microorganisms will scavenge absorbed nutrients and organics from the bio-surface particulates thereby regenerating the capacities of the particulates for those materials. The reactor may be aided through the intermittent or continuous introduction of an oxidizer, such as ozone or chlorine which may be added from oxidizer 15. The use of such oxidants has been reported in regenerating activated carbon columns through which potable water has been filtered, see Miller and Rice, Civil Engineering, February, 1978, page 81. The oxidizer may be added to $R_b$ prior to its entering the reactor blender 14 or it may be added to the reactor blender 14 directly.

The control of the amount of microorganisms and bio-surface particulate components added to the raw or primary sewage from line 2 can be achieved by known devices such as turbidity measurement devices and oxygen uptake meters and/or biomass measurement devices. Additional sensors may be employed to determine the strength and nature of the raw and primary sewage. There may thus be obtained a highly efficient balance, relating sewage strength, sludge microorganisms, particulates and desired degree of treatment, which balance can be maintained in the system. As bio-surface particulates are eroded or abraded to the point where they escape as fines in the effluent or waste sewage, or are otherwise lost from the system, additional bio-surface particulates may be supplied from the bio-surface particulate feed 16. The bio-surface particulates may be synthetic plastics, activated carbon, fuller's earth, clays, coal, glass, ceramic, etc., and these materials may be impervious, porous, solid, hollow, etc.

The following example illustrates the practice of this invention.

EXAMPLE

Raw sewage (1 million gallons per day—gpd) of approximately 150 parts per million (ppm) of BOD and containing 100 ppm of solids is mixed with recycled activated sludge and particles of activated carbon. The presence of the particles results in a higher rate of BOD removal than is obtained when the particles are omitted. The effluent mixed liquor from the aeration zone is fed to a secondary settling tank. Clarified waste liquor is discharged to the effluent outflow. The settled mixture of sludge and plastic surfaces is withdrawn from the secondary settling tank at a rate of 150,000 gpd. Of this, 100,000 gpd is recycled directly for mixing with influent sewage and 50,000 gpd is passed to a sluffing device where it is subjected to a shearing action by passing it through a pump, resulting in the removal of adherent sludge particles from the bio-surface particulates. From the sluffing device, the mixture is passed to a bio-surface separator. In the bio-surface separator, waste sludge which is free from bio-surface particulates is removed from the upper zone of the separator at a rate of 30,000 gpd and bio-surface particulates which still have some sludge organisms adhering thereto are removed from the lower portion of the bio-surface separator and returned for mixing with raw sewage at a rate of 20,000 gpd. The mixed liquor suspended solids are maintained at 2,500 ppm. The process is operated to maintain a level of about 1,000 ppm of bio-surface particulates as part of the 2,500 ppm suspended solids in the aeration zone. In this process, sufficient sludge is freed from the particulates to provide the quantity of waste sludge required to keep the system in balance. Complete separation of the particulates from the adhering sludge is unnecessary.

I claim:

1. An activated sludge sewage treatment process which comprises mixing influent sewage material with activated sludge and bio-surface particulates to provide a mixed liquor, passing said mixed liquor to an aeration zone wherein it is contacted with an oxygen-containing gas to reduce the BOD content thereof, passing the mixed liquor to a settling zone in which it is settled to separate bio-surface particulates having sludge adherent thereto and a clarified supernatant, removing said clarified supernatant from said settling zine, subjecting at least a portion of the separated bio-surface particulates having sludge adherent thereto to a treatment to separate at least a portion of the adherent sludge therefrom, passing the treated portion of bio-surface particulates and separated sludge to a bio-surface particulate-sludge separator, separating at least a portion of the sludge which is essentially free of bio-surface particulates, removing it from said bio-surface particulate separator and passing it to waste, and recycling the bio-surface particulates and remaining sludge for mixing with said influent sewage material.

2. A process as defined in claim 1 wherein a portion of the separated bio-surface particulates having sludge adherent thereto removed from said settling zone is recycled for mixing with influent sewage material and the remainder of said separated bio-surface particulates having sludge adherent thereto removed from said settling zone is treated to separate at least a portion of the adherent sludge therefrom.

3. A process as defined in claim 1 wherein said bio-surface particulates are solid particulates.

* * * * *